United States Patent
Rose et al.

(10) Patent No.: US 9,936,078 B2
(45) Date of Patent: Apr. 3, 2018

(54) CONFERENCE CALL UNMUTING

(71) Applicant: Lenovo Enterprise Solutions (Singapore) PTE. LTD., New Tech Park (SG)

(72) Inventors: Amy L. Rose, Chapel Hill, NC (US); Bryan L. Young, Tualatin, OR (US); Nathan J. Peterson, Oxford, NC (US); John S. Crowe, Durham, NC (US); Jennifer J. Lee-Baron, Morrisville, NC (US); Gary D. Cudak, Wake Forest, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 68 days.

(21) Appl. No.: 14/974,710

(22) Filed: Dec. 18, 2015

(65) Prior Publication Data
US 2017/0180557 A1  Jun. 22, 2017

(51) Int. Cl.
*H04M 3/56* (2006.01)

(52) U.S. Cl.
CPC .............. *H04M 3/568* (2013.01); *H04M 3/56* (2013.01)

(58) Field of Classification Search
CPC ........ H04M 3/56; H04M 3/563; H04L 65/403
See application file for complete search history.

(56) References Cited

U.S. PATENT DOCUMENTS

2014/0171047 A1* 6/2014 Mai ............... H04M 3/566
                                              455/416

FOREIGN PATENT DOCUMENTS

WO  WO 2014035372 A1 * 3/2014 ............ H04M 1/725

* cited by examiner

*Primary Examiner* — Nafiz E Hoque
(74) *Attorney, Agent, or Firm* — Kunzler, PC

(57) ABSTRACT

A method for unmuting a participant in a conference call is disclosed. The method includes receiving a request, from a second participant in a conference call, to unmute a voice communication device of a first participant in the conference call. The voice communication device of the first participant is muted prior to receiving the request to unmute. The method includes displaying, in response to receiving the request to unmute, an unmute indicator on an electronic display of the voice communication device of the first participant.

11 Claims, 6 Drawing Sheets

CONFERENCE CALL UNMUTING

BACKGROUND

Field

The subject matter disclosed herein relates to conference calls and more particularly relates to unmuting of conference calls.

Description of the Related Art

It is common for a participant to be on a conference call and have the voice communication device muted while doing other work, looking at documents on the participant's computer, etc. and for other participants to want the muted participant to unmute the call to participate. Quickly unmuting the call can be difficult, especially where unmuting is accomplished using a soft button displayed on the participant's electronic display along with other windows, applications, etc. The soft unmute button may be hidden or small. Where a hard unmute button is located on a telephone, finding the button may be difficult to find quickly.

BRIEF SUMMARY

A method for unmuting a participant in a conference call is disclosed. The method includes receiving a request, from a second participant in a conference call, to unmute a voice communication device of a first participant in the conference call. The voice communication device of the first participant is muted prior to receiving the request to unmute. The method includes displaying, in response to receiving the request to unmute, an unmute indicator on an electronic display of the voice communication device of the first participant.

In one embodiment, the unmute indicator includes a visual indicator on the electronic display that increases in size, becomes visible, changes color, moves on top of other displayed windows, and/or changes intensity. In another embodiment, the method includes, in response to receiving the request to unmute, playing an unmute sound on the voice communication device of the first participant. In another embodiment, the method includes receiving input from the first participant indicative of an intention to unmute the voice communication device of the first participant, and unmuting the voice communication device of the first participant in response to receiving the input from the first participant.

In other embodiments, the input from the first participant may include selection of a button on the unmute indicator, determining that the first participant is looking at the electronic display, receiving a voice command from the first participant, pressing an unmute button on the voice communication device, and/or detecting a movement of a portable electronic device of the first participant in a pattern, where the portable electronic device is in wireless communication with the voice communication device of the first participant.

In another embodiment, the input from the first participant includes determining that the first participant is looking at the electronic display and the method includes determining that the first participant is looking at a particular location on the electronic display. In another embodiment, wherein the particular location on the display includes a window on the electronic display associated with the conference call, an unmute button on the electronic display, and/or an unmute indicator on the electronic display where the unmute indicator has increased in size, became visible, changed color, moved on top of other displayed windows, and/or changed intensity.

In one embodiment, the method includes unmuting the voice communication device of the first participant in response receiving the request to unmute from the second participant. In another embodiment, the request to unmute from the second participant includes speaking an identifier of the first participant, speaking a command associated with unmuting a participant, and providing a command associated with unmuting a participant via one or more of a mouse and a keyboard.

Another method for unmuting the voice communication device of a participant includes receiving input from a first participant in a conference call indicative of an intention to unmute a voice communication device of the first participant that is muted. The conference call includes at least a second participant. The input from the first participant includes determining that the first participant is looking at an electronic display of voice communication device of the first participant and/or detecting a movement of a portable electronic device of the first participant in a pattern. The portable electronic device is in wireless communication with the voice communication device of the first participant. The method includes unmuting the voice communication device of the first participant in response to receiving the input from the first participant.

In one embodiment, the method includes receiving a request, from a second participant in a conference call, to unmute a voice communication device of a first participant in the conference call. The communication device of the first participant is muted prior to receiving the request to unmute. In the embodiment, the method includes, in response to receiving the request to unmute, displaying an unmute indicator on an electronic display of the voice communication device of the first participant, where the unmute indicator is displayed on the electronic display prior to receiving input from the first participant.

In another embodiment, the unmute indicator includes a visual indicator on the electronic display that increases in size, becomes visible, changes color, moves on top of other displayed windows and/or changes intensity. In another embodiment, determining that the first participant is looking at the electronic display includes determining that the first participant is looking at a particular location on the electronic display. In another embodiment, the particular location on the display includes a window on the electronic display associated with the conference call, an unmute button on the electronic display and/or an unmute indicator on the electronic display comprising an unmute indicator displayed that increases in size, becomes visible, changes color, moves on top of other displayed windows and/or changes intensity.

In another embodiment, detecting a movement of a portable electronic device of the first participant includes moving the portable electronic device in a pattern and/or the portable electronic device determining that the first participant is looking at the portable electronic device. In another embodiment, the portable electronic device is separate from the voice communication device of the first participant and the portable electronic device is a smart watch, a tablet computer, or a smartphone.

An apparatus for unmuting a voice communication device of a participant includes an unmute request module that receives a request, from a second participant in a conference call, to unmute a voice communication device of a first participant in the conference call. The communication device of the first participant is muted prior to receiving the request to unmute. The apparatus includes an unmute indicator module that, in response to receiving the request to unmute, displays an unmute indicator on an electronic display of the voice communication device of the first participant.

In another embodiment, the apparatus includes a first participant input module that receives input from the first participant indicative of an intention to unmute the voice communication device of the first participant and an unmute command module that unmutes the voice communication device of the first participant in response to receiving the input from the first participant. In a further embodiment, the first participant input module further includes an eye tracking module that determines that the first participant is looking at the electronic display and/or a device movement module that detects a movement of a portable electronic device of the first participant in a pattern. The portable electronic device is in wireless communication with the voice communication device of the first participant. In another embodiment, the apparatus includes an unmute sound module that, in response to receiving the request to unmute, plays an unmute sound on the voice communication device of the first participant.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
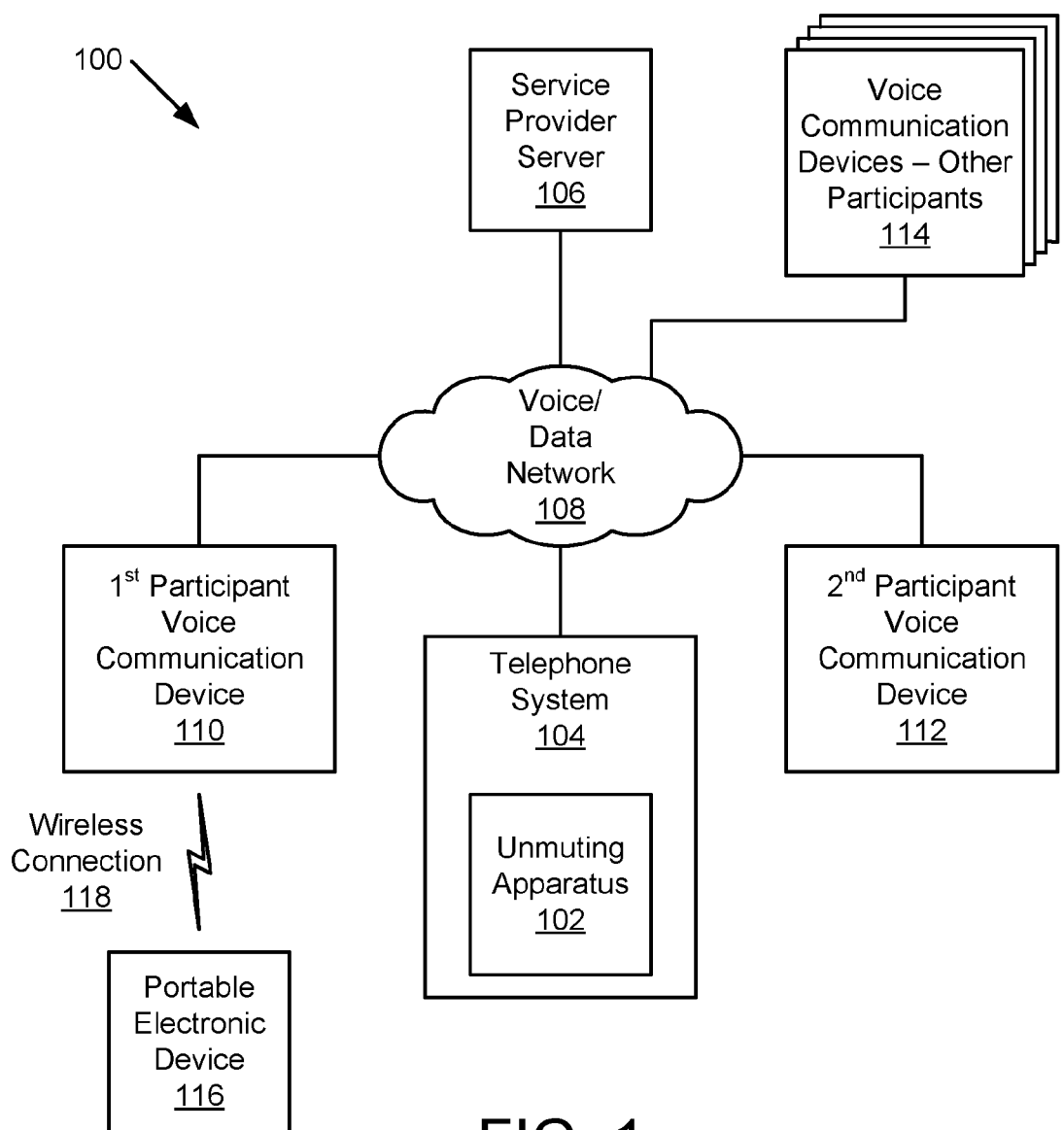
FIG. 1 is a schematic block diagram illustrating one embodiment of a system for unmuting a conference call.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in executable code and/or software for execution by various types of processors. An identified module of executable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different executable code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the executable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Executable code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by executable code. The executable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The executable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The executable code may also be loaded onto a computer, other programmable data processing apparatus, or other devices to cause a series of operational steps to be performed on the computer, other programmable apparatus or other devices to produce a computer implemented process such that the executable code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of executable code, which comprises one or more executable instructions of the executable code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and executable code.

The description of elements in each figure may refer to elements of proceeding figures. Like numbers refer to like elements in all figures, including alternate embodiments of like elements.

FIG. 1 is a schematic block diagram illustrating one embodiment of a system 100 for unmuting a conference call. The system 100 includes one embodiment of an unmuting apparatus 102, a telephone system 104, a service provider server 106, a voice/data network 108, a first participant voice communication device 110, a second participant voice communication device 112, voice communication devices 114 of other participants, a portable electronic device 116, and a wireless connection 118, which are described below.

The unmuting apparatus 102 assists a first participant in conference call that has muted a conference call to unmute the call at an appropriate time and in a quick and efficient manner. The first participant is connected to the conference call over a voice communication device, which may include a telephone with a screen, a cellular phone, a smartphone, a computer with an electronic display and microphone, a voice over IP ("VOIP") device, and the like. Any device or combination of devices capable of connecting the first participant with a conference call and that includes an electronic display may be used as the voice communication device. The conference call, in one embodiment, includes three or more participants, but may also include just two participants. The unmuting apparatus 102 is described in more detail with regard to the apparatuses 200, 300 of FIGS. 2 and 3.

As used herein, unmuting means an operation to activate a microphone of the voice communication device 110 of the first participant so that speaking and other sounds at the location of the voice communication device 110 can be heard on the conference call by the second participant and other participants. Muting means an operation to deactivate a microphone of the voice communication device 110 of the first participant so that speaking and other sounds at the location of the voice communication device 110 cannot be heard on the conference call by the second participant and other participants. While a phone call is muted, the first participant with the voice communication device 110 on mute can listen to what other participants are saying.

The system 100 includes a telephone system 104. The telephone system 104 facilitates connection of various voice communication devices 110, 112, 114 of participants in a conference call. The telephone system 104 may be a device separate from other devices or may be integrated into one or more computing devices. For example, the telephone system 104 may an application running on a server or other computer. Typically, the telephone system 104 facilitates telephone service between the voice communication devices 110, 112, 114 of the participants and to other parties through a voice/data network 108 using services of a telephone service provider. The telephone service provider typically makes use of a service provider server 106 as depicted in the system 100 of FIG. 1.

Often the telephone service provider provides typical telephone services in addition to conference calling. The telephone service provider may be a traditional telephone service provider that provides residential and commercial phone service over telephone lines, cable television lines, etc. or may include a service provider that makes use of internet service to provide telephone service. In some embodiments, two or more telephone service providers are used during a conference call. For example, various participants in a conference call may have different telephone service providers. One of skill in the art will recognize other configurations of one or more telephone systems 104, telephone service providers, etc. that may be used for a conference call where the unmuting apparatus 102 may be used.

The system 100 includes a voice/data network 108 may include telephone lines, cable television lines, fiber optic cables, wireless connections, satellite connections, etc. and any combination thereof. The voice/data network 108 may include routers, switches, cables, modems, etc. and some or all of the voice/data network 108 may include the Internet. The voice/data network 108, in one embodiment, is capable of voice and data transmissions. One of skill in the art will recognize other voice/data network 108 configurations capable of hosting a conference call and implementing the unmuting apparatus 102.

The system 100, in some embodiments, includes a portable electronic device 116 of the first participant connected to the first participant's voice communication device 110 over a wireless connection 118. The portable electronic device 116, in one embodiment, includes a smartwatch. Other embodiments may include a fitness bracelet, a smartphone, a tablet computer, a gaming device, a portable music player, and the like. The portable electronic device 116 is in wireless communication with the first participant's voice communication device 110 and is aware of the conference call and is connected in such a way as to control muting and unmuting on of the voice communication device 110. Muting and unmuting capability of the portable electronic device 116 is discussed in further detail below.

The wireless connection 118 between the first participant's voice communication device 110 and the portable electronic device 116 as well as any wireless connection of the voice/data network 108 may include a mobile telephone network. The wireless connections 108, 118 may also employ a Wi-Fi network based on any one of the Institute of Electrical and Electronics Engineers (IEEE) 802.11 standards. Alternatively, the wireless connections 108, 118 may be a BLUETOOTH® connection. In addition, the wireless connections 108, 118 may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connections 108, 118 may employ a ZigBee® connection based on the IEEE 802 standard. In one embodiment, the wireless connections 108, 118 employ a Z-Wave® connection as designed by Sigma Designs®. Alternatively, the wireless connections 108, 118 may employ an ANT® and/or ANT+® connection as defined by Dynastream® Innovations Inc. of Cochrane, Canada.

The wireless connections 108, 118 may be an infrared connection including connections conforming at least to the Infrared Physical Layer Specification (IrPHY) as defined by the Infrared Data Association® (IrDA®). Alternatively, the wireless connections 108, 118 may be a cellular telephone network communication. All standards and/or connection types include the latest version and revision of the standard and/or connection type as of the filing date of this application.

The unmuting apparatus 102 is depicted in the system 100 of FIG. 1 as residing in the telephone system 104. In other embodiments, portions of the unmuting apparatus may be located in each of the voice communication devices 110, 112, 114, in the service provider server 106, or other location convenient for operation of the unmuting apparatus 102. One of skill in the art will recognize other locations for all or part of the unmuting apparatus 102.

Figure 2:
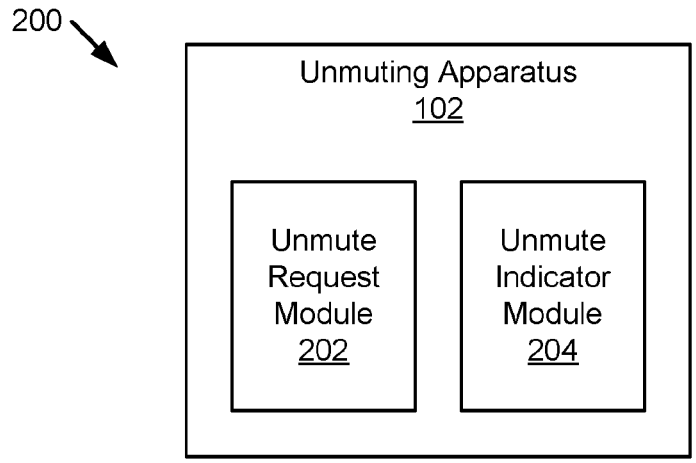
FIG. 2 is a schematic block diagram illustrating one embodiment of an apparatus for unmuting a conference call.

FIG. 2 is a schematic block diagram illustrating one embodiment of an apparatus 200 for unmuting a conference call. The apparatus 200 includes one embodiment of the unmuting apparatus 102 that includes an unmute request module 202 and an unmute indicator module 204, which are described below.

The apparatus 200, in one embodiment, includes an unmuting request module 202 that receives a request, from a second participant in a conference call, to unmute a voice communication device 110 of a first participant in the conference call. The voice communication device of the first participant is muted prior to receiving the request to unmute. The request to unmute from the second participant may take several forms. For example, the request to unmute may include the second participant speaking the name or other identifier of the first participant. For example, where the first participant is a fourth caller, the identifier may be "fourth caller" and the second participant may say "fourth caller." The identifier may be nickname, a code name, one or more assigned words, and the like.

In another embodiment, the request to unmute includes the second participant speaking a command associated with unmuting a participant. For example, the command may be "unmute" or some other word or group of words that signal the apparatus 200 of a desire for the first participant to unmute. In another embodiment, the second participant may speak the command associated with unmuting a participant along with the name or identifier of the first participant. For example, the second participant may say "unmute John Doe," which serves as the request to unmute.

In another embodiment, the request to unmute includes the second participant providing a command associated with unmuting a participant via a mouse, a keyboard, or other input device. For example, the second participant may click on an unmute request button displayed on an electronic display of the second participant where the unmute request button serves as the request to unmute for the unmute request module 202. In another embodiment, the second participant uses a mouse, keyboard, etc. to select an unmute request command or button and then speaks the name or identifier of the first participant. One of skill in the art will recognize other ways for the unmute request module 202 to receive an unmute request from the second participant.

The apparatus 200 includes, in some embodiments, an unmute indicator module 204 that, in response to receiving the request to unmute, displays an unmute indicator on an electronic display of the voice communication device 110 of the first participant. The electronic display is associated with, located with, or part of the voice communication device 110 of the first participant.

The unmute indicator is intended to facilitate easy unmuting of the conference call by the first participant. In one embodiment, the unmute indicator is a window that appears or moves to the front of other windows, icons, etc. on the electronic display of the first participant. For example, the first participant may be working on another document and the unmuting indicator may pop up in front of the document. In another embodiment, the unmute indicator increases in size in response to the request to unmute. For example, the unmute indicator may be a mute/unmute button on a telephone or conference call application and may be small or obscured on the electronic display and the unmute indicator module 204 may increase the size of the mute/unmute button to make the mute/unmute button more prominent.

In some embodiments, the unmute indicator module 204 displays the unmute indicator by changing color of the unmute indicator, by changing intensity of the unmute indicator, by moving the unmute indicator, or any other effect that draws attention of the first participant to the unmute indicator. The unmute indicator module 204 may use a combination of effects to display the unmute indicator in a way to draw attention to the unmute indicator.

Figure 3:
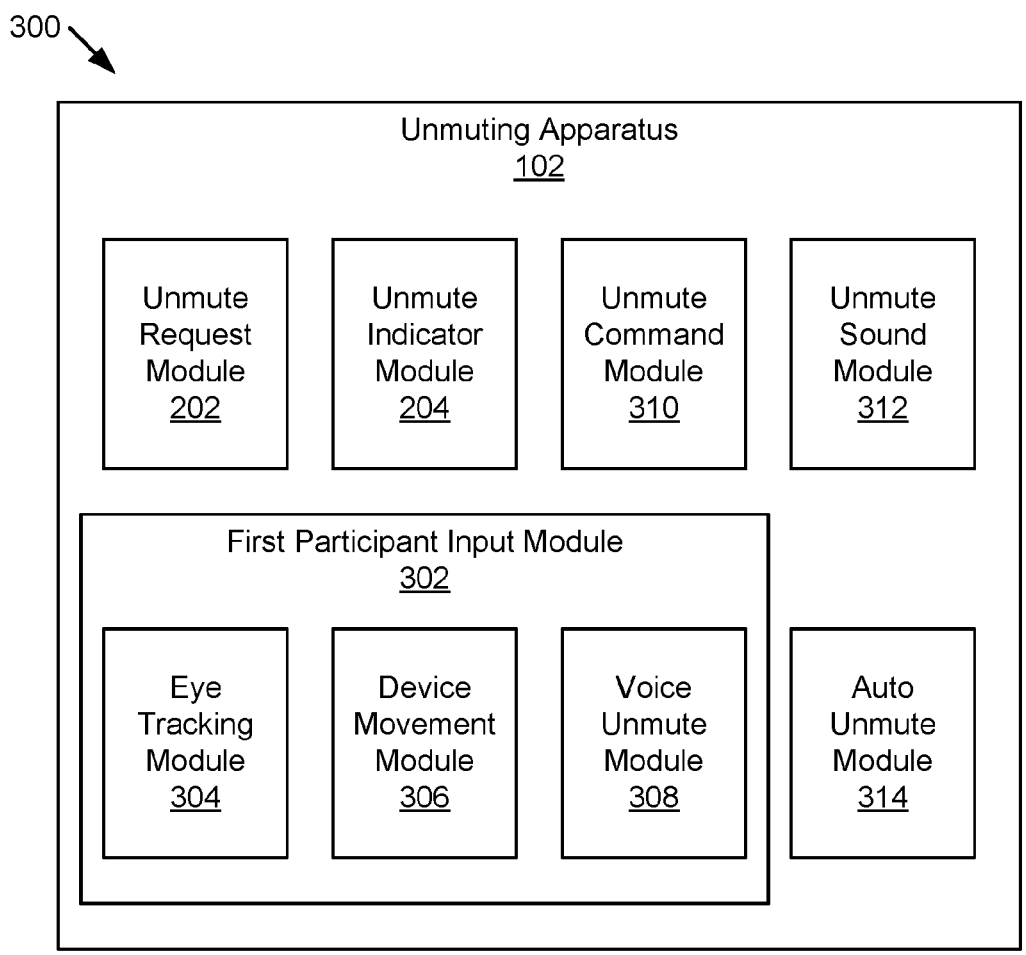
FIG. 3 is a schematic block diagram illustrating an alternate embodiment of an apparatus for unmuting a conference call.

FIG. 3 is a schematic block diagram illustrating an alternate embodiment of an apparatus 300 for unmuting a conference call. The apparatus 300 includes another embodiment of the unmuting apparatus 102 that includes an unmute request module 202 and an unmute indicator module 204, which are substantially similar to those described above in relation to the apparatus 200 of FIG. 2. In addition, the apparatus 300 may include, in various embodiments, a first participant input module 302 with an eye tracking module 304, a device movement module 306 and a voice unmute module 308, an unmute command module 310, an unmute sound module 312 and an auto unmute module 314, which are described below.

The apparatus 300, in one embodiment, includes a first participant input module 302 that receives input from the first participant indicative of an intention to unmute the voice communication device 110 of the first participant. In one embodiment, the input from the first participant is received after the unmute indicator module 204 displays the unmute indicator. In another embodiment, the input from the first participant is received independent of the unmute indicator module 204 displaying the unmute indicator. For example, the first participant may want to unmute the conference call without the second participant requesting unmuting of the first participant.

In one embodiment, the first participant input module 302 includes an eye tracking module 304 that determines that the first participant is looking at the electronic display. Many electronic devices include a camera and include an eye tracking function. The eye tracking module 304, in one embodiment, facilitates quick and easy unmuting of the conference call by the first participant. In another embodiment, the eye tracking module 304 determines if the first participant is looking at a particular location on the electronic display. For example, the eye tracking module 304 may determine if the first participant is looking at the unmute indicator, an unmute button, or other particular location on the electronic display associated with unmuting.

In one embodiment, the particular location is a window on the electronic display associated with the conference call. For example, the eye tracking module 304 may determine that the first participant is looking at the unmute indicator after the unmute indicator has increased in size, became visible, changed color, moved on top of other displayed windows, changed intensity, and the like.

In another embodiment, the first participant input module 302 includes a device movement module 306 that detects a movement of a portable electronic device 116 of the first participant in a pattern. The portable electronic device 116 is in wireless communication with the voice communication device 110 of the first participant. Many portable electronic devices 116, such as smartwatches and smartphones, are connected to other electronic devices and may be aware of a conference call.

For example, the voice communication device 110 of the first participant may be a laptop or desktop computer and the portable electronic device 116 of the first participant may include an application, such as a calendar or phone application, that may be aware that the first participant is participating in the conference call. Also, many portable electronic devices 116 include an accelerometer or other device to track movement. A specific movement or pattern of movement of the portable electronic device 116 may be assigned as a signal that the first participant wishes to unmute the voice communication device 110. The device movement module 306 may detect the specific movement or pattern of movement associated with the unmute request and may send a signal that the first participant wishes to unmute the voice communication device 110. In another embodiment, another particular movement or pattern of movement may be assigned to muting the voice communication device 110 and the device movement module 306 may move the portable electronic device 116 in the pattern associated with muting to signal the voice communication device 110 to mute the conference call.

In another embodiment, the apparatus 300 detects a button press, touching a display of the portable electronic devices 116, etc., which may also signal that the first participant wants to unmute the voice communication device 110 of the first participant. In another embodiment, the device movement module 306 detects a specific movement combined with another action, such as pressing a button on the portable electronic devices 116, and the combination of movement and additional action are recognized as the first participant requesting unmuting of the voice communication device 110. One of skill in the art will recognize other ways that the device movement module 306 can detect movement and other actions of the portable electronic devices 116 wirelessly connected to the voice communication device 110 and recognize the movement and/or actions as input requesting unmuting the voice communication device 110.

The first participant input module 302, in some embodiments, includes a voice unmute module 308 that receives a voice command from the first participant where the voice command is input from the first participant indicative of an intention to unmute the voice communication device 110. For example, the first participant may say "unmute," or "unmute call" or other command that may be recognized by the voice unmute module 308 as a desire of the first participant to unmute the voice communication device 110. In other embodiments, the first participant input module 302 is capable of receiving other forms of input from the first participant that are indicative of the first participant wanting to unmute the voice communication device 110, such as pressing an unmute button, selecting an unmute button on the electronic display of the voice communication device 110, and the like.

The apparatus 300, in some embodiments, includes an unmute command module 310 that unmutes the voice communication device 110 of the first participant in response to receiving the input from the first participant. For example, where the first participant input module 302 receives input from the eye tracking module 304, the device movement module 306, the voice unmuting module 308, or other input, such as a mute/unmute button, the unmute command module 310 unmutes the voice communication device 110 of the first participant. Once the unmute command module 310 unmutes the voice communication device 110 of the first participant is able to speak and be heard by the other participants on the conference call.

In one embodiment, the voice communication device 110 of the first user has a microphone that remains active during muting of the conference call where sounds picked up by the microphone are not transmitted over the conference call. The voice unmute module 308 received input from the microphone and the unmute command module 310 allows sounds picked up by the microphone to be heard on the conference call.

In one embodiment, the apparatus 300 includes an unmute sound module 312 that, in response to receiving the request to unmute, plays an unmute sound on the voice communication device 110 of the first participant. To further catch the attention of the first participant, the unmute sound module 312 plays a sound that may be unique or conspicuous so that the first participant will understand that the second participant is requesting the first participant to unmute. In one embodiment, the unmute sound differs from other sounds of the conference call and may include a voice recording or similar verbal sound with something like "please unmute," or something similar.

In one embodiment, the apparatus includes an auto unmute module 314 that unmutes the voice communication device 110 of the first participant in response receiving the request to unmute from the second participant. Typically, the apparatus 300 is set up to receive input from the first participant before the unmute command module 310 unmutes the voice communication device 110 of the first participant. Under some conditions the auto unmute module 314 allows the second participant to unmute the voice communication device 110 of the first participant. For example, the second participant may have administrative authority over the conference call. In another example, the first participant may be unable to unmute the voice communication device 110 of the first participant due to a physical impairment. One of skill in the art will recognize other conditions where the second participant is allowed to unmute the voice communication device 110 of the first participant.

Figure 4A:
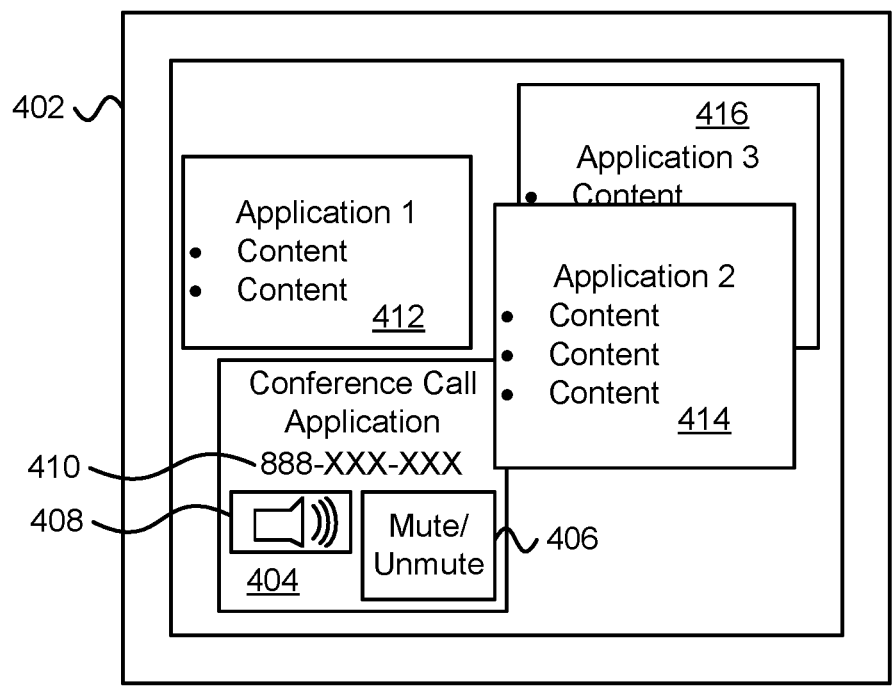
FIG. 4A is a schematic block diagram illustrating one embodiment of an electronic display of a voice communication device of a first participant in a conference call prior to display of an unmuting indicator.

FIG. 4A is a schematic block diagram illustrating one embodiment of an electronic display of a voice communication device 110 of a first participant in a conference call prior to display of an unmuting indicator. FIG. 4A includes an electronic display 402 that includes a conference call application 404 displayed on the electronic display 402.

The conference call application 404 may include various features, such as a mute/unmute button 406, a speaker button 408, a phone number 410 or other information about a conference call, etc. In addition to the conference call application 404, the electronic display 402 may also include other applications 412, 414, 416. In one embodiment, an application 414 may be partially or completely obscuring the conference call application 404. The electronic display 402 and/or buttons of the voice communication device 110 may make unmuting difficult or time consuming for the first participant. Unwanted delay of only a few seconds may be undesirable because the first participant may miss an opportunity to interject in a conversation, or delay in responding to the second participant may become awkward while the first participant is attempting to unmute the voice communication device 110.

Figure 4B:
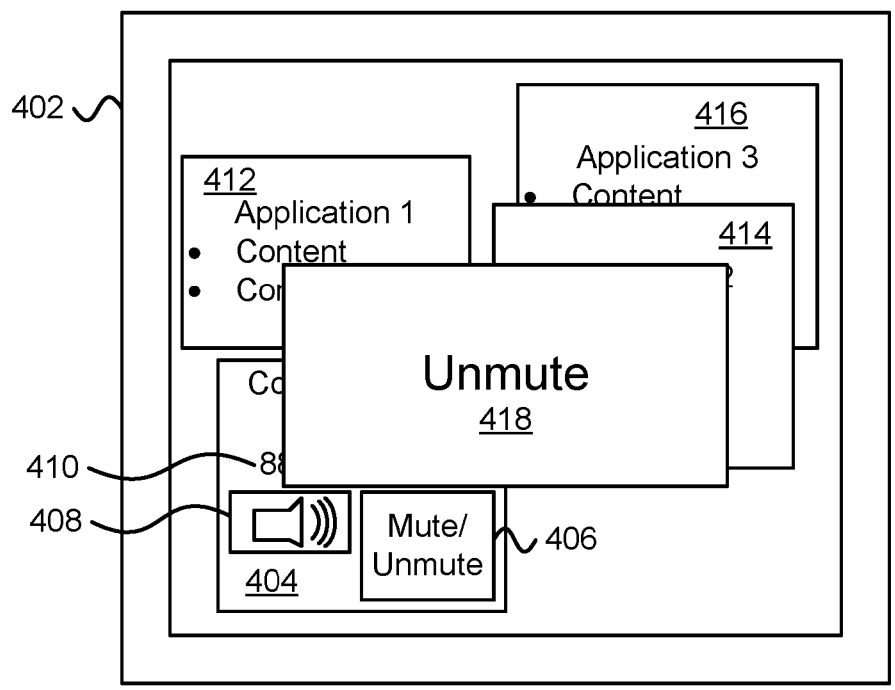
FIG. 4B is a schematic block diagram illustrating one embodiment of an electronic display of a voice communication device of a first participant in a conference call after a display of an unmuting indicator.

FIG. 4B is a schematic block diagram illustrating one embodiment of an electronic display of a voice communication device 110 of a first participant in a conference call after a display of an unmuting indicator. FIG. 4A includes the electronic display 402 with the conference call application 404 along with the other applications 412, 414, 416. In addition, an unmute indicator 418 is prominently displayed with respect to the other applications 412, 414, 416 to notify the first participant that the second participant is requesting that the first participant unmute the voice communication device 110 of the first participant.

Also, having the unmute indicator 418 prominently displayed with respect to the other applications 412, 414, 416 may be used to more easily facilitate unmuting the voice communication device 110. For example, a prominent display of the unmute indicator 418 may provide a larger target for the eye tracking module 304 when determining if the first participant is looking at the unmute indicator 418.

While the unmute indicator 418 is depicted separate from the conference call application 404, the unmute indicator 418 may also be integrated with the conference call application 404 so that the conference call application 404 is moved to the front of the other applications 412, 414, 416, is made bigger, or the like to notify the first participant that the second participant is requesting unmuting or to make unmuting easier. One of skill in the art will recognize other ways to implement the unmute indicator 418.

Figure 5:
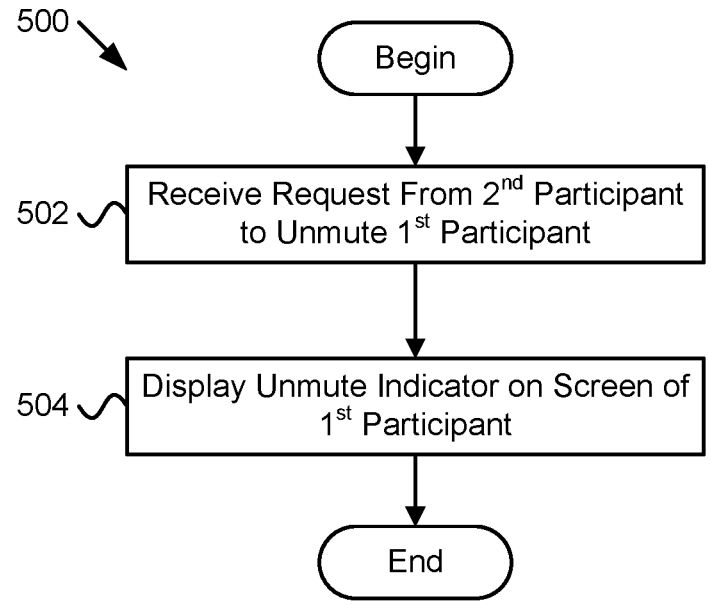
FIG. 5 is a schematic flow chart diagram illustrating one embodiment of a method for unmuting a conference call.

FIG. 5 is a schematic flow chart diagram illustrating one embodiment of a method 500 for unmuting a conference call. The method 500 begins and receives 502 a request, from a second participant in a conference call, to unmute a voice communication device 110 of a first participant in the conference call. The voice communication device 110 of the first participant is muted prior to receiving the request to unmute. The method 500 displays 504, in response to receiving the request to unmute, an unmute indicator 418 on an electronic display 402 of the voice communication device 110 of the first participant, and the method 500 ends. In some embodiments of the method 500, the unmute request module 202 receives 502 the request to unmute from the second participant and the unmute indicator module 204 displays 504 the unmute indicator 418.

Figure 6:
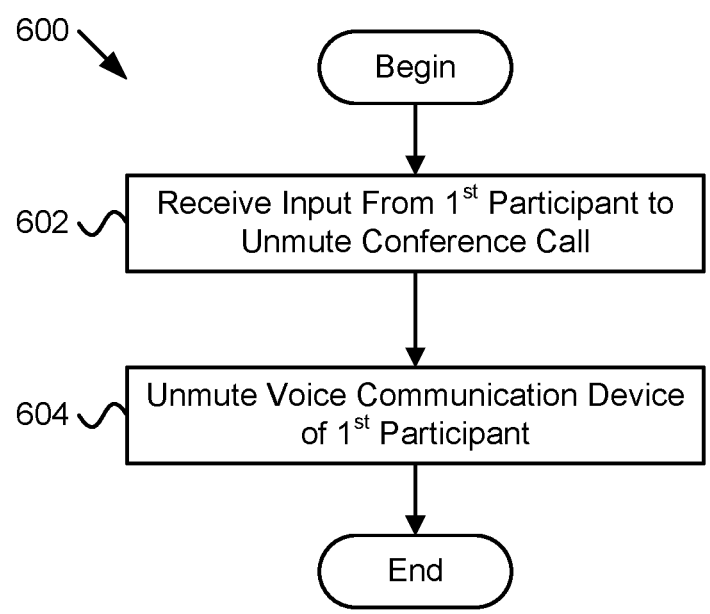
FIG. 6 is a schematic flow chart diagram illustrating an alternate embodiment of a method for unmuting a conference call.

FIG. 6 is a schematic flow chart diagram illustrating an alternate embodiment of a method 600 for unmuting a conference call. The method 600 begins and receives 602 input from a first participant in a conference call indicative of an intention to unmute a voice communication device 110 of the first participant that is muted. The conference call includes at least a second participant. In one embodiment, the input from the first participant includes determining that the first participant is looking at the electronic display 402. In a further embodiment, the input from the first participant includes determining that the first participant is looking at a particular location on the electronic display 402.

In another embodiment, input from the first participant includes detecting a movement of a portable electronic device 116 of the first participant in a pattern. The portable electronic device 116 is in wireless communication with the voice communication device 110 of the first participant. The pattern is assigned as indicating that the first participant wishes to unmute the voice communication device 110. The pattern may include a particular sequence of movements.

The method 600 unmutes 604 the voice communication device 110 of the first participant, and the method 600 ends. In one embodiment, the first participant input module 302 receives 602 the input from the first participant and the unmute command module 310 unmutes 604 the voice communication device 110 of the first participant.

Figure 7:
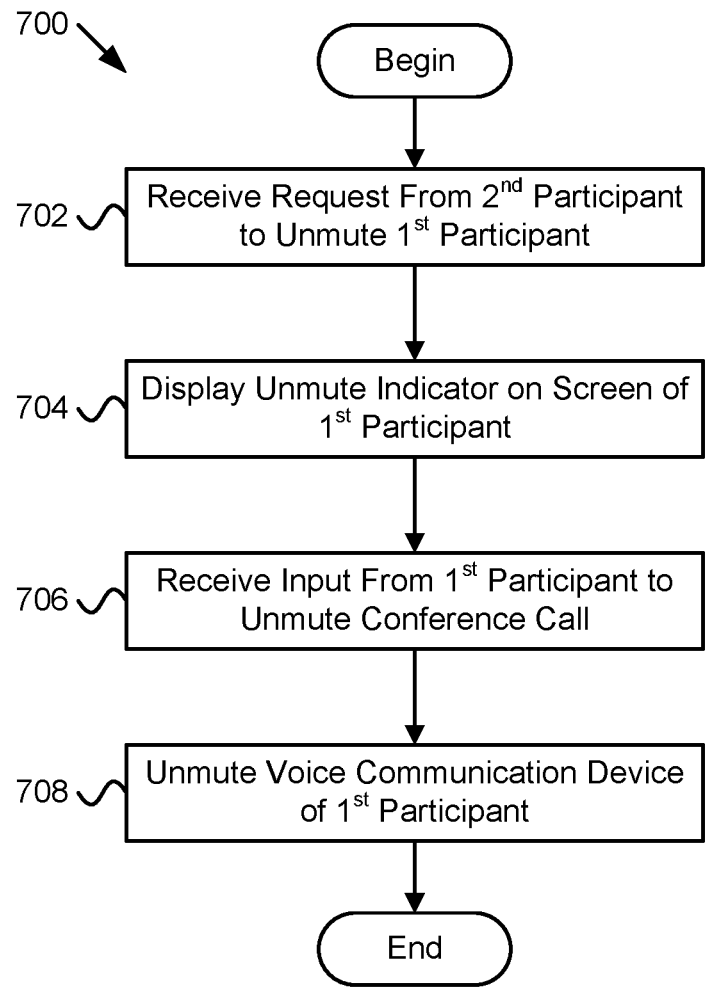
FIG. 7 is a schematic flow chart diagram illustrating another embodiment of a method for unmuting a conference call.

FIG. 7 is a schematic flow chart diagram illustrating another embodiment of a method 700 for unmuting a conference call. The method begins and receives 702 a request, from a second participant in a conference call, to unmute a voice communication device 110 of a first participant in the conference call. The voice communication device 110 of the first participant is muted prior to receiving the request to unmute. The request from the second participant may take different forms, some of which are described above in relation to the unmute request module 202 of the apparatus 200 of FIG. 2.

The method 700 displays 704, in response to receiving the request to unmute, an unmute indicator 418 on an electronic display 402 of the voice communication device 110 of the first participant. The unmute indicator 418 may be implemented as described above in relation to the unmute indicator module 204 and in other description above. The method 700 receives 706 input from a first participant in a conference call indicative of an intention to unmute a voice communication device 110 of the first participant that is muted and unmutes 708 the voice communication device 110 of the first participant, and the method 700 ends. The input from the first participant may be in the form of looking at the electronic display 402, moving a portable electronic device 116, voice command or other function of a module described above.

Figure 8:
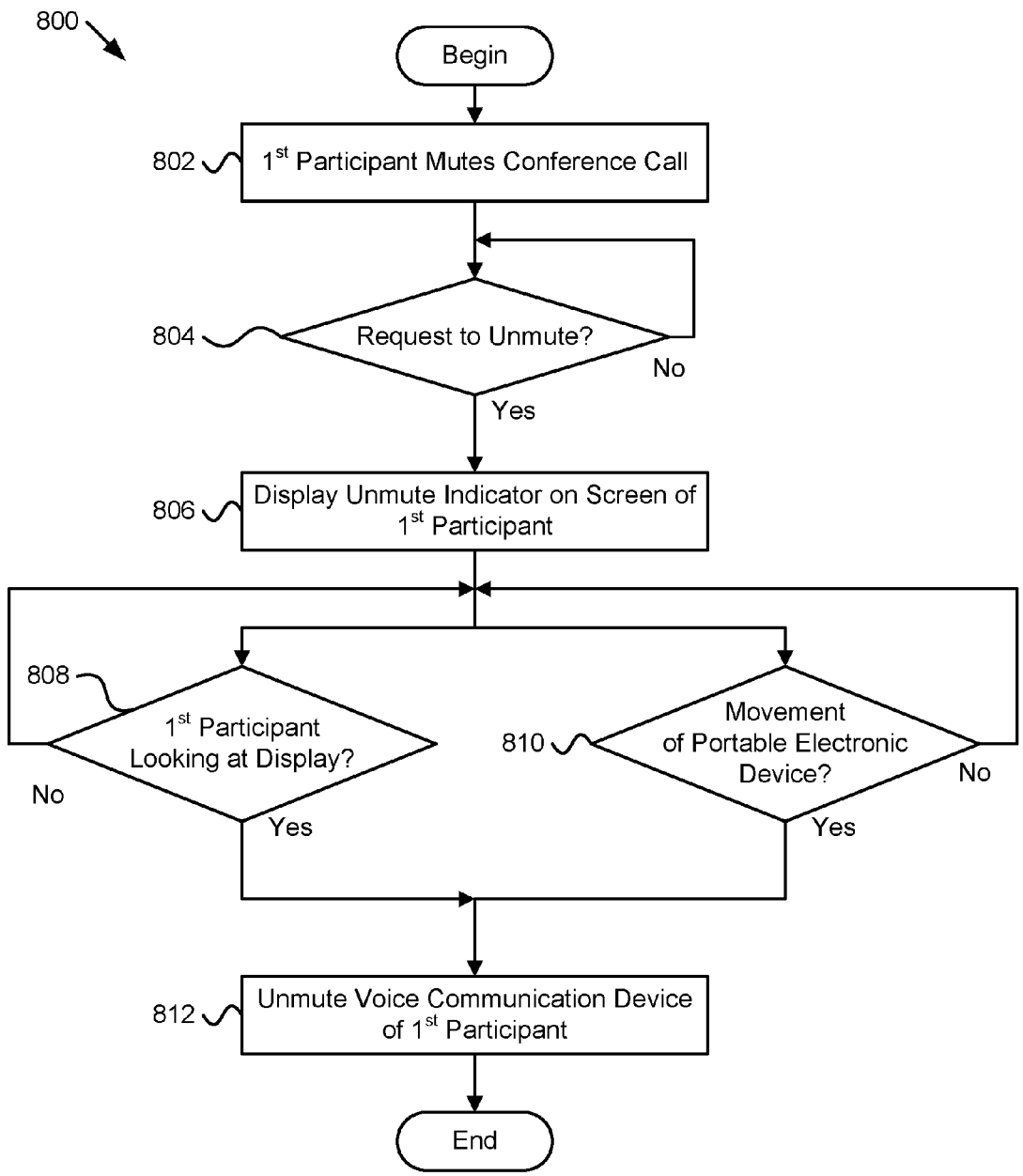
FIG. 8 is a schematic flow chart diagram illustrating a fourth embodiment of a method for unmuting a conference call.

FIG. 8 is a schematic flow chart diagram illustrating a fourth embodiment of a method 800 for unmuting a conference call. The method 800 begins when the first participant mutes 802 the voice communication device 110 of the first participant in a conference call with other participants connected through voice communication devices 112, 114. The method 800 determines 804 if there is a request to unmute the voice communication device 110 of the first participant. If the method 800 determines 804 that there has not been a request to unmute the voice communication device 110 of the first participant, the method 800 returns and continues to determine 804 if there is a request to unmute the voice communication device 110.

If the method 800 determines 804 that there has been a request to unmute the voice communication device 110 of the first participant, the method 800 displays 806 an unmute indicator 418 on the electronic display 402 of the voice communication device 110 of the first participant. In the embodiment, the method 800 determines 808 if the first participant is looking at the electronic display 402, or alternatively at a particular location on the electronic display 402, and simultaneously determines 810 if there is movement of a portable electronic device 116 of the first participant in a particular pattern. The portable electronic device 116 is wirelessly connected to the voice communication device 110 of the first participant. If the method 800 determines 808 that the first participant is not looking at the electronic display 402 and determines 810 that there is no movement of a portable electronic device 116, the method 800 returns and continues to determine 808 if the first participant is looking at the electronic display 402, or at a particular location on the electronic display 402, and determines 810 if there is movement of a portable electronic device 116 in a particular pattern.

If method 800 determines 808 that the first participant is looking at the electronic display 402, or alternatively is looking at a particular location on the electronic display 402, the method 800 unmutes 812 the voice communication device 110 of the first participant, and the method 800 ends. If the method 800 determines 810 that there is movement of a portable electronic device 116 in a particular pattern, the method 800 unmutes 812 the voice communication device 110 of the first participant, and the method 800 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   receiving a request, from a second participant in a conference call, to unmute a voice communication device of a first participant in the conference call, the voice communication device of the first participant muted prior to receiving the request to unmute;
   in response to receiving the request to unmute, displaying an unmute indicator on an electronic display of the voice communication device of the first participant;
   detecting movement in a pattern of a portable electronic device of the first participant, the portable electronic device in communication with the voice communication device of the first participant, the portable electronic device separate from the voice communication device of the first participant, wherein pattern indicates that the first participant wishes to unmute the voice communication device; and
   unmuting the voice communication device of the first participant in response to receiving the pattern of movement of the portable electronic device.

2. The method of claim 1, wherein the unmute indicator comprises a visual indicator on the electronic display that one or more of:
increases in size;
becomes visible;
changes color;
moves on top of other displayed windows; and
changes intensity.

3. The method of claim 1, further comprising, in response to receiving the request to unmute, playing an unmute sound on the voice communication device of the first participant.

4. The method of claim 1, wherein the request to unmute from the second participant comprises one or more of:
speaking an identifier of the first participant;
speaking a command associated with unmuting a participant; and
providing a command associated with unmuting a participant via one or more of a mouse and a keyboard.

5. A method comprising:
receiving input from a second participant in a conference call indicative of a request to unmute a voice communication device of a first participant that is muted, the conference call comprising at least a first and a second participant;
detecting a movement of a portable electronic device of the first participant in a pattern, the portable electronic device in wireless communication with the voice communication device of the first participant, the portable electronic device separate from the voice communication device of the first participant, wherein pattern indicates that the first participant wishes to unmute the voice communication device; and
unmuting the voice communication device of the first participant in response to detecting the pattern of movement of the portable electronic device of the first participant.

6. The method of claim 5, further comprising:
in response to receiving the request to unmute, displaying an unmute indicator on an electronic display of the voice communication device of the first participant,
wherein the unmute indicator is displayed on the electronic display prior to detecting the pattern of movement of the portable electronic device of the first participant.

7. The method of claim 6, wherein the unmute indicator comprises a visual indicator on the electronic display that one or more of:
increases in size;
becomes visible;
changes color;
moves on top of other displayed windows; and
changes intensity.

8. The method of claim 5, wherein detecting a movement of a portable electronic device of the first participant comprises one or more of:
moving the portable electronic device in a pattern; and
the portable electronic device determining that the first participant is looking at the portable electronic device.

9. The method of claim 5, wherein the portable electronic device comprises one of a smart watch, a tablet computer, and a smartphone.

10. An apparatus comprising:
an unmute request module that receives a request, from a second participant in a conference call, to unmute a voice communication device of a first participant in the conference call, the communication device of the first participant muted prior to receiving the request to unmute;
an unmute indicator module that, in response to receiving the request to unmute, displays an unmute indicator on an electronic display of the voice communication device of the first participant;
a device movement module that detects a movement of a portable electronic device of the first participant in a pattern, the portable electronic device in wireless communication with the voice communication device of the first participant, the portable electronic device separate from the voice communication device of the first participant, wherein pattern indicates that the first participant wishes to unmute the voice communication device; and
an unmute command module that unmutes the voice communication device of the first participant in response to the device movement module detecting the movement of the portable electronic device of the first participant in the pattern.

11. The apparatus of claim 10, further comprising an unmute sound module that, in response to receiving the request to unmute, plays an unmute sound on the voice communication device of the first participant.

* * * * *